United States Patent
Schaur et al.

(10) Patent No.: US 10,365,499 B2
(45) Date of Patent: Jul. 30, 2019

(54) LASER-MARKED ARTICLE WITH MOIRE PATTERN

(71) Applicant: D. Swarovski KG, Wattens (AT)

(72) Inventors: Helmut Schaur, Absam (AT); Helmut Fuchs, Hall in Tirol (AT)

(73) Assignee: D. Swarovski KG, Wattens (AT)

( * ) Notice: Subject to any disclaimer, the term of this patent is extended or adjusted under 35 U.S.C. 154(b) by 186 days.

(21) Appl. No.: 14/013,133

(22) Filed: Aug. 29, 2013

(65) Prior Publication Data

US 2013/0342910 A1    Dec. 26, 2013

Related U.S. Application Data

(63) Continuation of application No. PCT/AT2012/000051, filed on Mar. 6, 2012.

(30) Foreign Application Priority Data

Mar. 7, 2011    (AT) ..................... 301/2011

(51) Int. Cl.
    *B41M 5/26*    (2006.01)
    *B44C 1/22*    (2006.01)
    (Continued)

(52) U.S. Cl.
    CPC .......... *G02B 27/60* (2013.01); *B23K 26/0006* (2013.01); *B23K 26/0624* (2015.10);
    (Continued)

(58) Field of Classification Search
    CPC .... G02B 27/60; B23K 26/0057; B41M 5/262; B44F 1/06; G03H 1/0011; G03H 1/30;
    (Continued)

(56) References Cited

U.S. PATENT DOCUMENTS

| | | |
|---|---|---|
| 4,662,653 A | 5/1987 | Greenaway |
| 4,766,026 A | 8/1988 | Lass et al. |
| (Continued) | | |

FOREIGN PATENT DOCUMENTS

| | | |
|---|---|---|
| CN | 1662390 | 8/2005 |
| CN | 1689050 | 10/2005 |
| (Continued) | | |

OTHER PUBLICATIONS

KR20100090670AEnglish (Translation), Hwang Ji Young, Conductive Patterns and Method for Manufacturing the Same, Aug. 16, 2010.*

(Continued)

*Primary Examiner* — Evan P Dzierzynski
*Assistant Examiner* — Alberto Betancourt
(74) *Attorney, Agent, or Firm* — Stevens & Showalter LLP (57) ABSTRACT

The invention relates to an article (I) that in at least one region (2) consists of a transparent or translucent material, in particular of glass, wherein the article (I) comprises a dynamic moire pattern in the transparent or translucent region (2), and wherein the moire pattern comes about by superimposing at least two, preferably precisely two, laser-engraved grid structures (3), which at least in regions are visually separated from each other. The grid structures (3) are located: in different layers (4) inside the transparent or translucent region (2); or in at least one layer (4) inside and in a coating (5) of at least one surface of the transparent or translucent region (2); or in at least one first layer (4) inside the transparent or translucent region (2) and at least one second virtual layer (6) that is produced by reflecting the first layer (4) at a reflecting surface (7).

17 Claims, 7 Drawing Sheets

(51) Int. Cl.
*B44F 1/06* (2006.01)
*B23K 26/00* (2014.01)
*B23K 26/53* (2014.01)
*C03C 23/00* (2006.01)
*G02B 27/60* (2006.01)
*B23K 103/00* (2006.01)
*B23K 26/0622* (2014.01)

(52) U.S. Cl.
CPC ............ *B23K 26/53* (2015.10); *B41M 5/262* (2013.01); *B44F 1/06* (2013.01); *C03C 23/0025* (2013.01); *B23K 2103/50* (2018.08); *B44C 1/228* (2013.01)

(58) Field of Classification Search
CPC ........ G03H 1/028; G03H 1/28; G03H 1/0276; G03H 1/26; B42D 25/328; B42D 25/00; B42D 25/29; B42D 25/324; B42D 25/425; B42D 25/342; B42D 2033/04; B42D 2033/24; B42D 2033/30
USPC ....... 359/1–2, 577, 580, 581, 587, 567, 569, 359/558, 24, 25, 15, 22, 23, 566, 619, 359/626; 382/210; 430/1, 2; 235/380, 235/457; 264/132, 1.34; 356/605, 356/616–620, 396–397
See application file for complete search history.

(56) References Cited

U.S. PATENT DOCUMENTS

| | | | |
|---|---|---|---|
| 4,894,110 A | 1/1990 | Lass et al. | |
| 5,206,496 A * | 4/1993 | Clement | B29C 71/04 219/121.6 |
| 5,694,229 A * | 12/1997 | Drinkwater et al. | 359/2 |
| 6,774,340 B1 * | 8/2004 | Chiba | B41M 5/24 219/121.68 |
| 8,541,713 B1 * | 9/2013 | Dugan | G02B 23/14 359/428 |
| 2003/0232210 A1 | 12/2003 | Haas et al. | |
| 2004/0008888 A1 | 1/2004 | Patton et al. | |
| 2004/0076310 A1 | 4/2004 | Hersch et al. | |
| 2004/0104205 A1 | 6/2004 | Hayashi et al. | |
| 2004/0245765 A1 * | 12/2004 | Taylor | B41M 3/14 283/81 |
| 2005/0104365 A1 | 5/2005 | Haas et al. | |
| 2005/0147807 A1 | 7/2005 | Haas et al. | |
| 2006/0003295 A1 | 1/2006 | Hersch et al. | |
| 2006/0129489 A1 | 6/2006 | Hersch et al. | |
| 2006/0257594 A1 | 11/2006 | Haas et al. | |
| 2006/0280331 A1 | 12/2006 | Chosson et al. | |
| 2007/0041611 A1 | 2/2007 | Hersch et al. | |
| 2007/0063053 A1 * | 3/2007 | Bergmann et al. | 235/487 |
| 2007/0075150 A1 * | 4/2007 | Luthi | B42D 25/342 235/494 |
| 2007/0097441 A1 * | 5/2007 | Wang | B41J 3/60 358/3.06 |
| 2007/0178295 A1 | 8/2007 | Haas et al. | |
| 2007/0279697 A1 | 12/2007 | Widmer Gomres et al. | |
| 2008/0018097 A1 * | 1/2008 | Wicker | B41M 3/14 283/91 |
| 2008/0304525 A1 | 12/2008 | Kupisiewicz et al. | |
| 2011/0037762 A1 * | 2/2011 | Elber | G06T 15/02 345/419 |
| 2011/0141522 A1 | 6/2011 | Vago | |
| 2012/0031647 A1 * | 2/2012 | Hwang | G06F 3/045 174/250 |
| 2012/0314293 A1 * | 12/2012 | Chang | G02B 27/2214 359/580 |

FOREIGN PATENT DOCUMENTS

| | | |
|---|---|---|
| CN | 101243021 | 8/2008 |
| CN | 101504469 | 8/2009 |
| DE | 44 07 547 | 9/1995 |
| DE | 10 2005 039 430 | 2/2007 |
| DE | 10 2007 004 524 | 7/2008 |
| DE | 10 2008 038 990 | 2/2010 |
| EP | 0 219 011 | 4/1987 |
| EP | 1 321 305 | 6/2003 |
| EP | 1 780 039 | 5/2007 |
| EP | 1 845 496 | 10/2007 |
| EP | 2 085 702 | 8/2009 |
| KR | 20100090670 A * | 8/2010 |
| WO | 01/68385 | 9/2001 |
| WO | 2007/019991 | 2/2007 |
| WO | 2010/018208 | 2/2010 |

OTHER PUBLICATIONS

International Search Report dated Oct. 5, 2012 in International (PCT) Application No. PCT/AT2012/000051.
Austrian Office Action dated Jan. 3, 2012 in corresponding Austrian Patent Application No. A 301/2011.
Chinese Office Action dated Dec. 4, 2014 in corresponding Chinese Application No. 201280011950.3.

* cited by examiner

LASER-MARKED ARTICLE WITH MOIRE PATTERN

The invention relates to an article, which in at least one region consists of a transparent or translucent material, in particular glass, wherein the article comprises a dynamic moiré pattern in the transparent or translucent region, and wherein the moiré pattern is produced by superposition of at least two, preferably precisely two, laser-engraved grid structures, which at least in some regions are visually separated from one another. A method for producing the article according to the invention will also be disclosed.

The articles to which the invention relates exhibit a laser marking in the transparent or translucent region. Preferably decorative articles are involved, that are of economic importance particularly in the jewelry sector, as decoration articles in living rooms, or for example also as name plates.

Transparent or translucent materials are hereinafter understood to mean materials that are permeable to electromagnetic waves whose wavelengths lie in the visible range. This property does not however exclude the fact that the materials can be worked with the aid of laser engraving methods, such as for example internal laser marking, in which the wavelengths of the lasers that are used lie in the UV range (abbreviation of "ultraviolet") to the IR range (abbreviation for "infra-red") and can thus extend beyond the range of visible light.

The transparent or translucent materials that are relevant in the context of the invention preferably include transparent brittle-hard materials, such as for example certain types of glass (e.g. crystal or cut glass), precious stones, diamonds or imitation diamonds, e.g. of (cubic) zirconia.

The aforementioned method of internal laser marking, e.g. of glass, has been known for a long time. In this connection reference may be made to US patent specification U.S. Pat. No. 5,206,496. To summarise, in this method a laser beam is used that is directed on to the glass surface and penetrates the glass body to a predetermined depth at which the marking is to be formed, where it can be focussed and at a sufficiently large intensity produces a slightly milky material change recognisable by the human eye, without the glass surface thereby being altered. In the limiting case the marking can of course also take place on the glass surface itself.

The disadvantage in this connection is that the markings produced by means of this method have a rigid appearance.

Various approaches to avoid this disadvantage are known from the prior art. Thus, in EP 0 219 011 A2 it is proposed to produce identity cards by means of laser marking, whose appearance varies on changing the angle of observation. For this purpose two superimposed markings are applied to the upper side and lower side of the identity card, which in turn is a disadvantage since laser markings produced on the surface of an article always involve the formation of grooves, which sooner or later become gather dirt. This has negative effects on the appearance. Also, in the solution proposed in EP 0 219 011 A2 it is not possible to form the superimposed markings also completely differently, which means that the choice of different configurations is greatly restricted.

The object of the present invention is to avoid the aforedescribed disadvantages, and to provide articles improved compared to the prior art with laser markings that (under a slight change of the angle of observation and/or of angle of the incident light rays) have an appearance that evokes a dynamic and/or a spatial impression.

This is achieved with the article according to the invention, which in at least one region consists of a transparent or translucent material, in particular glass, wherein the article comprises a dynamic moiré pattern in the transparent or translucent region, and wherein the moiré pattern is formed by superposition of at least two, preferably precisely two, laser-engraved grid structures, which at least in some regions are visually separated from one another, and wherein the grid structures are located
  in different layers inside the transparent or translucent region,
  or in at least one layer inside the transparent or translucent region and in a coating of at least one surface of the transparent or translucent region,
  or in at least one first layer inside the transparent or translucent region and at least one second virtual layer that is produced by reflection of the first layer at a reflecting surface.

Although the moiré effect, which is responsible for the occurrence of moiré patterns, is a generally known phenomenon, at this point it may be defined once more: the moiré effect is an optical interference effect that occurs due to the superposition of fine, e.g. lattice-shaped, grid structures.

A "dynamic" moiré pattern is understood to be a moiré pattern that dynamically changes under a slight change in the angle of observation and/or angle of the incident light rays. This is only possible if the two grid structures are separated from one another at least in certain regions. If the grid structures were to lie everywhere directly on top of one another, then only a rigid moiré pattern would be produced, which would not alter under a slight change of the angle of observation and/or angle of the incident light rays. The addition of the word "visually" to "separated from one another" takes account of the fact that material changes achievable by using laser engraving methods cannot be clearly demarcated. They typically consist of a visual, i.e. recognisable with the human eye (e.g. under a microscope) core region and additional artefacts, which become visible only with the aid of special imaging methods. Basically only the core regions play a role in the present invention.

A basic idea of the invention therefore consists in generating at least two grid structures with the aid of the laser marking method, which when superimposed produce a dynamic moiré pattern. In this connection, according to the invention there are three possible sites at which the grid structures can be located: 1. in different layers inside the transparent or translucent region, 2. in at least one layer inside the transparent or translucent region and in a coating of at least one surface of the transparent or translucent region, and 3. in at least one first layer inside the transparent or translucent region and in at least one second virtual layer that is produced by reflection of the first layer at a reflecting surface. The term "layer" is understood to be a two-dimensional extension of finite thickness, wherein such a layer can also be curved. It is understood that the layers are "imaginary" layers of a homogeneous body and not layers physically distinguishable from one another.

The coating mentioned in connection with the second possibility can for example be a typical metallic effect coating for crystal glasses, which preferably imparts a colour effect. The reflecting surface mentioned in connection with the third possibility can for example be applied by vapour deposition on a surface of the transparent or translucent region.

In an advantageous embodiment the outlines of the grid structures and thus the outline of the overall moiré pattern form a motif, wherein this motif can also be composed of several parts spatially separated from one another. As examples there may be mentioned animals, heavenly bodies, letters, letterings composed of letters, company symbols and logos.

Further advantageous embodiments are characterised in that 1. the grid structures are identical with or different from each other and/or that 2. one of the grid structures consists of at least two segments with a different grid pattern, and/or 3. with an identical grid pattern but rotated relative to one another, and/or 4. with an identical grid pattern but displaced relative to one another. In the first three examples a dynamically continuous, and in the fourth example a dynamically discontinuous appearance can be produced. Furthermore, a further advantage of the examples 2 and 3 is that (if the contour of the moiré pattern is a motif), an inner structure can thereby be imparted to this motif. In this way a spatial impression can be evoked, although actually only a two-dimensional motif is involved.

According to a further embodiment the grid structures consists of lines. Preferably these lines are arranged equidistantly with respect to one another. However, embodiments are also possible in which the distance between the centres of two adjacent lines varies in a predetermined manner, for example observe a certain mathematical function.

It has proved particularly advantageous if the ratio of the gauge of a line to the distance between the centres of two adjacent lines is between 1:1.5 and 1:10. Preferably the ratio is 1:3.5 and/or the gauge of a line is less than or equal to 15 micrometers.

It is advantageous in the production of the article according to the invention to produce the grid structures with the aid of a pulsed laser. Suitable lasers for this purpose are for example commercially available solid-state lasers with pulse durations in the range of a few nanoseconds and UV wavelengths, or commercially available ultra-short pulsed lasers with pulse durations in the range of a few picoseconds or femtoseconds and wavelengths in the UV to IR range, advantageously in the range from approximately 300 nm to 550 nm. A production technology consequence resulting from the use of pulsed lasers is that the individual lines of which the grid structures can for example consist have to be composed of a succession of individual points. This fact has no negative effects on the appearance of the moiré pattern however.

According to a further advantageous feature in the production of the article according to the invention, the grid structures are produced in succession, and specifically in each case at the focal point of the laser beam.

In the case where the moiré pattern is to be produced by superposition of precisely two laser-engraved structures, wherein the two grid structures are located in a layer inside the transparent or translucent region and in the coating of a surface of the transparent or translucent region and are formed identically, an advantageous procedure differing therefrom is also available: if a value is chosen for the distance between the layer in the inside and the coating that is not too large compared to the value of the Rayleigh length, then it is possible to laser-engrave the grid structure inside and at the same time produce behind the focal plane a grid structure in the coating. This is made possible by the fact that typically lower intensities are required for the modification of the coating. It should be noted that the grid structure produced in the coating in this way is slightly broadened compared to the grid structure located inside the transparent or translucent region, since the laser beam at this point has already diverged somewhat compared to the focal point, and the light-matter interactions in the transparent or translucent region and in the coating are of a different nature. From the production technology aspect this method has the advantage that the moiré pattern can be produced in only one step.

BRIEF DESCRIPTION OF THE DRAWINGS

Further details and advantages of the present invention are described in more detail hereinafter with the aid of the examples of the figures and with reference to the exemplary embodiments illustrated in the drawings, in which.

DETAILED DESCRIPTION OF THE INVENTION

Figure 1A:
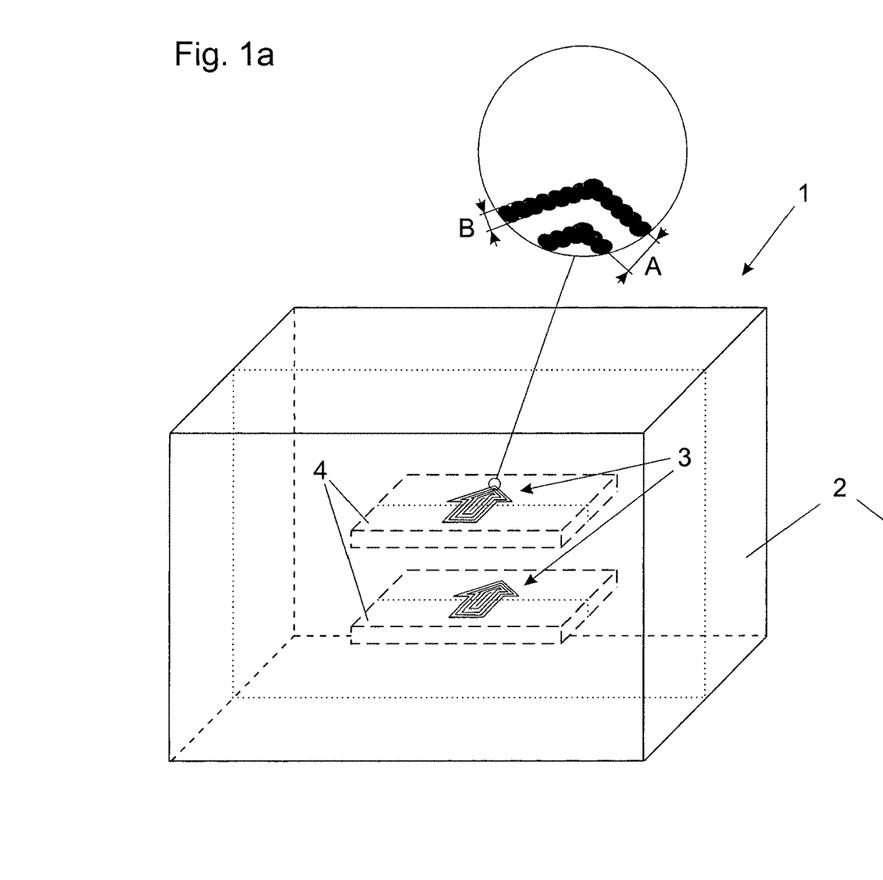
FIG. 1a is a perspective view of a first schematically represented preferred embodiment of the article according to the invention.

FIG. 1a serves to illustrate a first preferred exemplary embodiment of the article 1 according to the invention, which at least in one region 2 consists of a transparent or translucent material, in particular of glass. In this case the moiré pattern is produced by superposition of two laser-engraved grid structures 3, wherein the grid structures 3 are located in different layers 4 inside the transparent or translucent region 2. The outlines of the grid structures 3 (and therefore the outline of the moiré pattern) in this case form a motif in the shape of an arrow. The grid structures 3 consist of lines. Part of the tip of the arrow of the upper grid structure 3 is shown enlarged. In this enlargement it is schematically shown that the lines are composed of individual points—as would be the case in the production of the article 1 according to the invention with the aid of a pulsed laser. It is possible of course to arrange the individual points so close to one another that subsequently they can no longer be distinguished from one another. Therefore, as has already been said above, this production method also has no negative effects on the appearance of the moiré pattern. In the enlarged illustration of the arrow tip the gauge of a line is denoted by the letter B and the distance between the centres of two adjacent lines is denoted by the letter A. It should also be noted that the points illustrated in the enlargement are intended to show the visual, i.e. recognisable with the human eye (e.g. under a microscope), core regions of the material changes produced with the aid of the laser light.

Figure 1B:
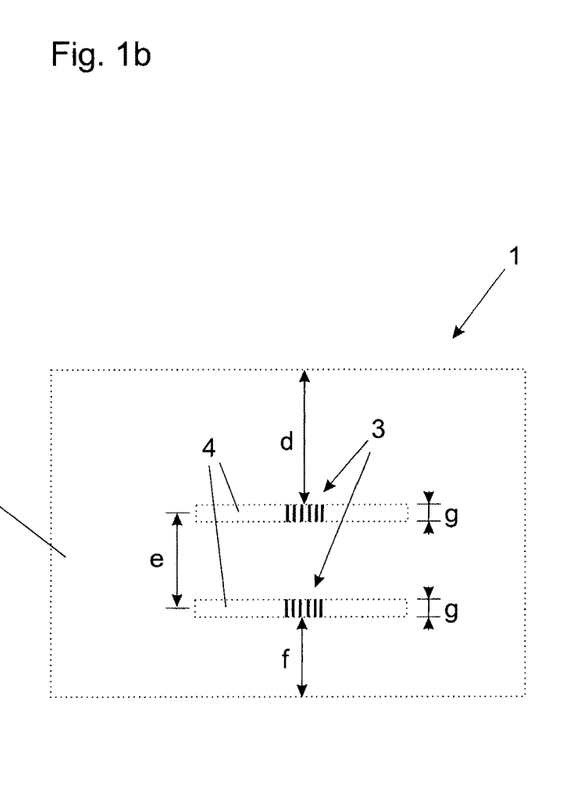
FIG. 1b is a cross-section of the first schematically represented preferred embodiment of the article according to the invention.

FIG. 1b shows a cross-section of the first preferred embodiment illustrated in FIG. 1a of the article 1 according to the invention. The illustrated cross-sectional plane is indicated in FIG. 1a by dotted lines. FIG. 1b contains different dimensioning variables: the distances d and f of the layers 4 (and therefore of the grid pattern 3) to the upper surface and lower surface of the transparent or translucent region 2, the distance e between the layers 4, and also the thickness g of the layers 4. The thickness g is fixed so that the laser intensity necessary for the visible material change is available only in a limited region around the focal point. If a smaller thickness g is desired, then the aperture angle at the focal point must be enlarged so that the light intensity decreases more rapidly with increasing distance from the focal point, and/or the laser output must be reduced. The minimal distance that the layers 4 should have is therefore determined by the fact that the two grid structures 3 are visually separated from one another, so that a dynamic moiré pattern can be formed. This however does not prevent the grid structures 3 being able to overlap in a small region or to border one another. Overall, in such a case a dynamic moiré pattern in the sense of this disclosure would still be produced. The distance e is of course limited upwardly by the fact that the moiré pattern disappears starting at a certain value of the distance. Typically this limit lies in the region of a few millimeters. Special cases of the embodiment illustrated here are embodiments in which d=0 (the upper grid structure is located on the surface) and/or f=0 (the lower grid structure is located on the lower surface).

Figure 2:
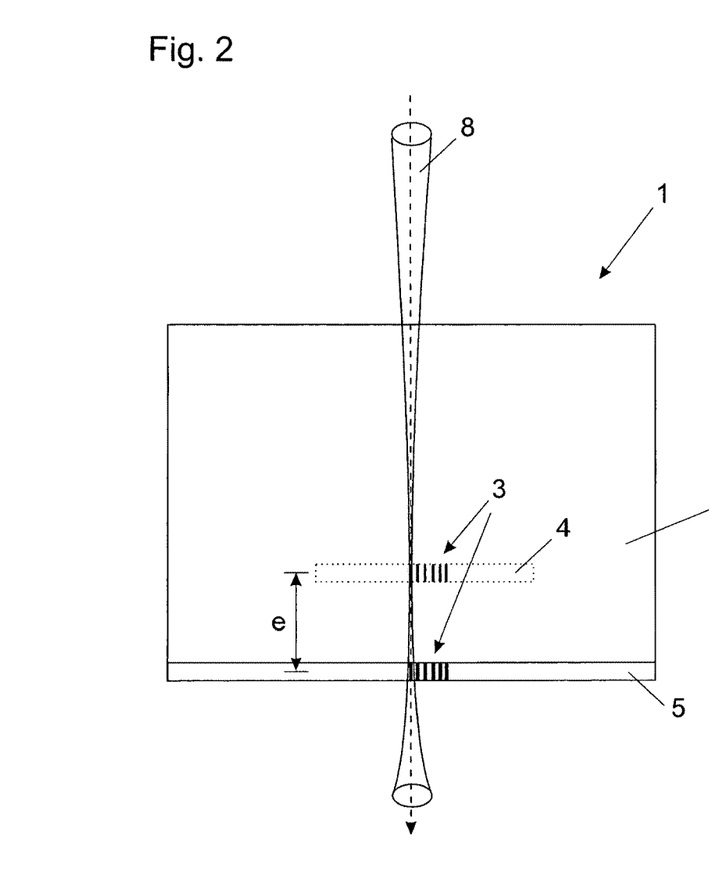
FIG. 2 is a cross-section of a second schematically represented preferred embodiment of the article according to the invention.

FIG. 2 serves to illustrate a second preferred exemplary embodiment of the article 1 according to the invention. In this case the moiré pattern is produced by superposition of precisely two laser-engraved grid structures, wherein the two grid structures 3 are located in a layer 4 inside and in the coating 5 of a surface of the transparent or translucent region 2. A laser beam 8 is also schematically illustrated, with the aid of which the two grid structures 3 can simultaneously be produced. The propagation direction of the laser beam 8 is indicated by a dotted arrow. In the drawing account was also taken of the fact that the grid structure in the coating 5 is slightly broadened compared to the grid structure lying inside the transparent or translucent region 2. It should be noted that the two grid structures 3 can also be produced independently of one another, in two chronologically successive process steps. For example, first of all the grid structure could be laser-engraved inside the transparent or translucent region 3, then the coating 5 could be applied and finally the grid structure could be produced in the latter. Alternatively a large aperture angle could also be formed at the focal point, so that the energy at site of the coating 5 is no longer sufficient to modify this at the same time as the formation of the grid structure lying inside. One would then shift the focal point of the laser beam into the coating plane and laser engrave the grid structure there.

Figure 3:
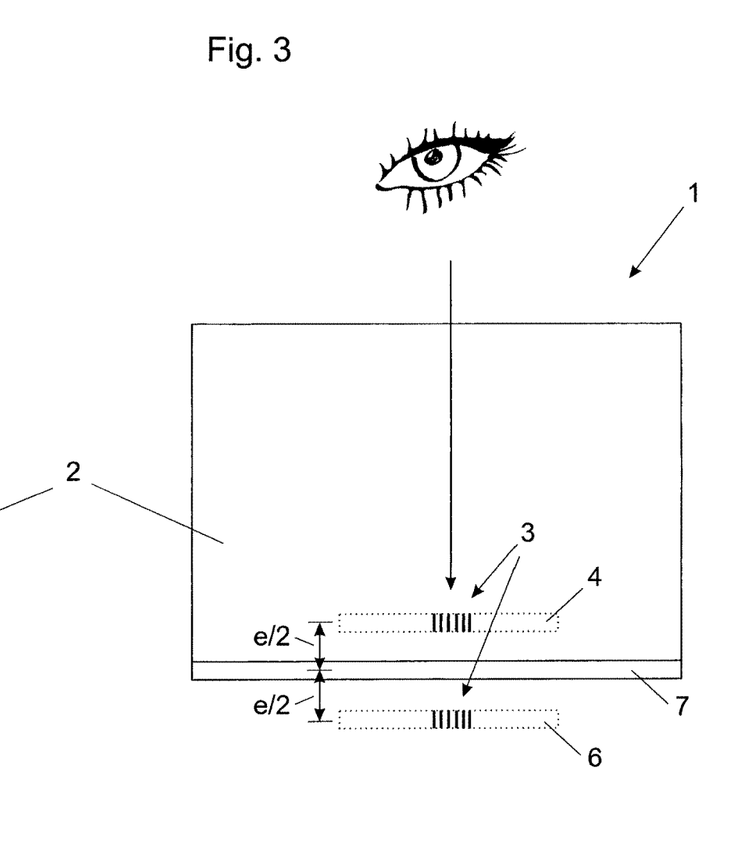
FIG. 3 is a cross-section of a third schematically represented preferred embodiment of the article according to the invention.

FIG. 3 serves to illustrate a third preferred embodiment of the article 1 according to the invention. In this case the moiré pattern is formed by superposition two grid structures 3, wherein the two grid structures 3 are located in a first layer 4 inside the transparent or translucent region 2 and in a second virtual layer 6, which is produced by reflection of the first layer 4 at a reflecting surface 7. Accordingly only one grid structure has to be laser-engraved. Its mirror image then forms the second (virtual) grid structure if the article 1 is viewed from above.

Figure 4A:
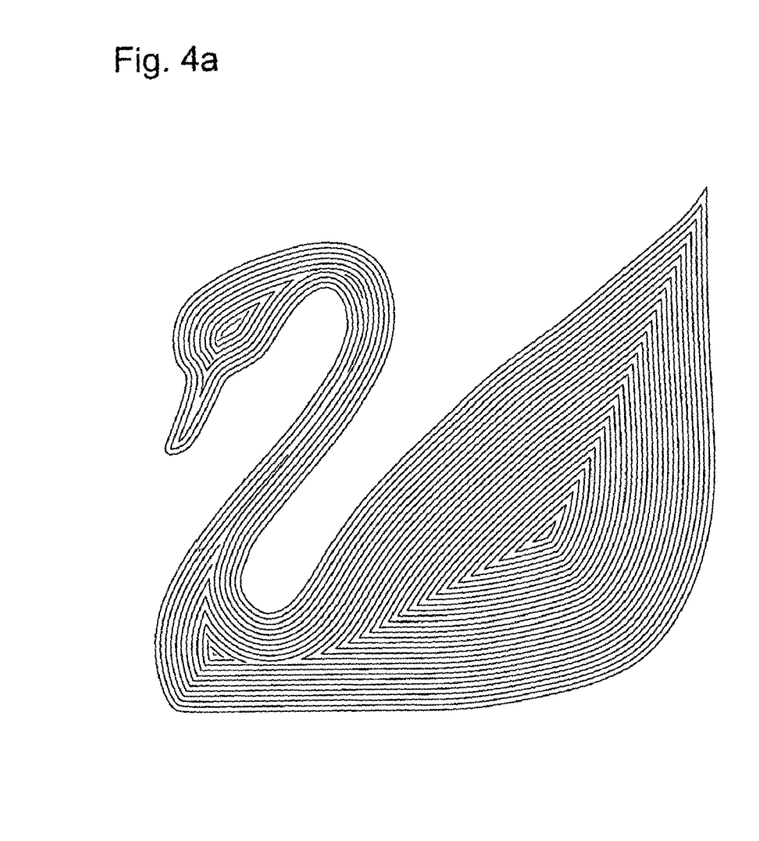
FIG. 4a is a plan view of a first schematically represented exemplary grid structure.
Figure 4B:
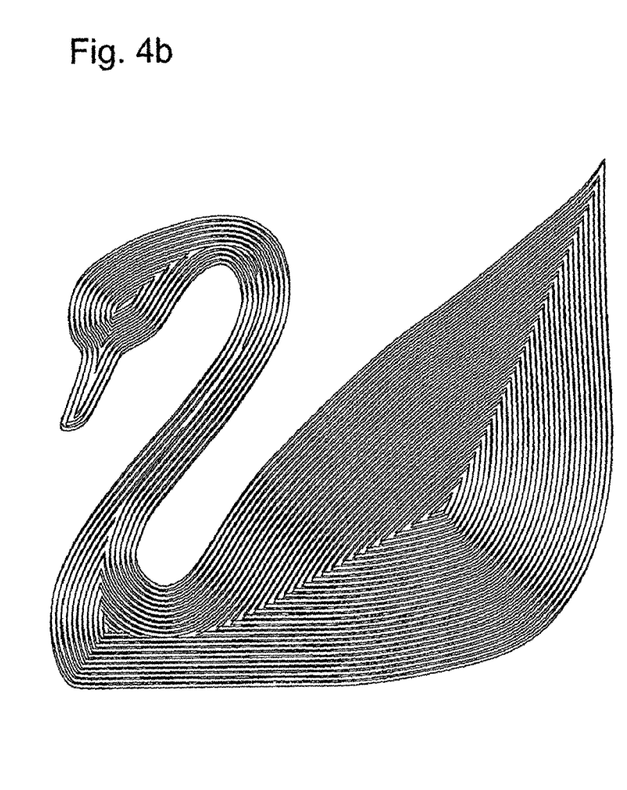
FIG. 4b is a moiré pattern that is produced by superimposing the first exemplary grid structure.
Figure 5:
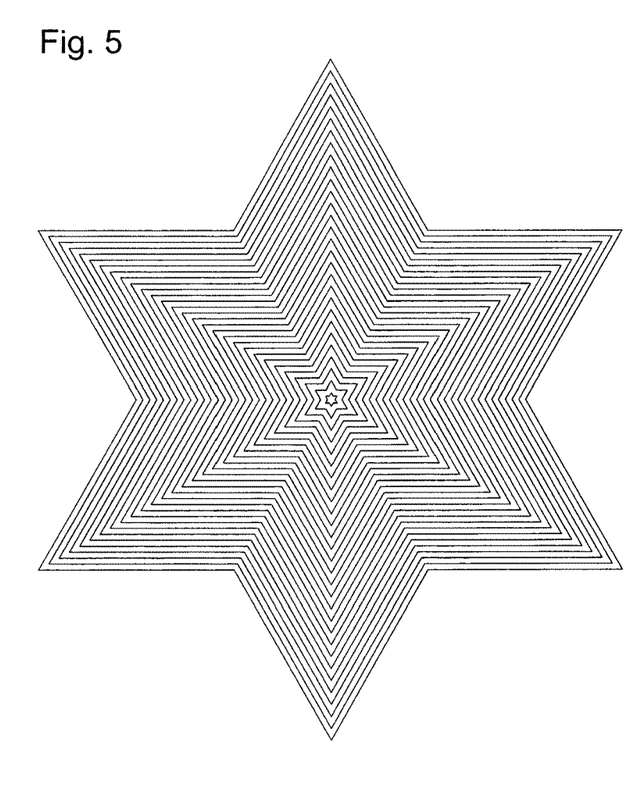
FIG. 5 is a plan view of a second schematically represented exemplary grid structure.

FIG. 4a shows a plan view of a first exemplary grid structure, whose outline represents a swan. The grid structure consists in this case of a plurality of segments each having the same grid pattern, but rotated relative to one another: the grid pattern consists everywhere of mutually equidistant lines, although several segments can be distinguished from one another, at whose boundaries the line do not "continuously" transform into one another, but exhibit a "kink". As explained in more detail above, the swan thereby exhibits an internal structure. For example, an eye or different wing parts can be recognised. The grid structure is shown only schematically here. In reality it has for example a length of approximately 7.5 mm, the gauge of a line is 10 micrometers, and the distance between the centres of two adjacent lines is 35 micrometers. FIG. 4b shows a moiré pattern that has been formed by superimposing two identical grid structures, namely the structures illustrated in FIG. 4a. The optical interference effect, which is manifested by a modulation of the brightness, can clearly be recognised. For representation technique reasons in this case it is only possible to illustrate a rigid moiré pattern. If however the two grid structures are in reality visually separated from one another at least in certain regions, then under a slight change in the angle of observation and/or angle of the incident light rays the brightness modulation alters dynamically and continuously, and a dynamic moiré pattern is produced.

FIGS. 5, 6, 7a and 7b show plan views of further exemplary grid structures, whose contours represent stars or the sun.

Figure 6:
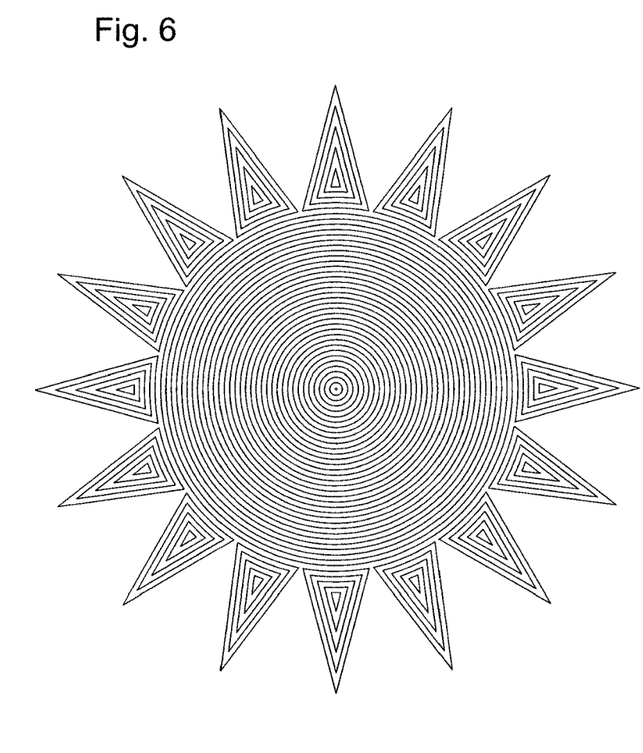
FIG. 6 is a plan view of a third schematically represented exemplary grid structure.
Figure 7A:
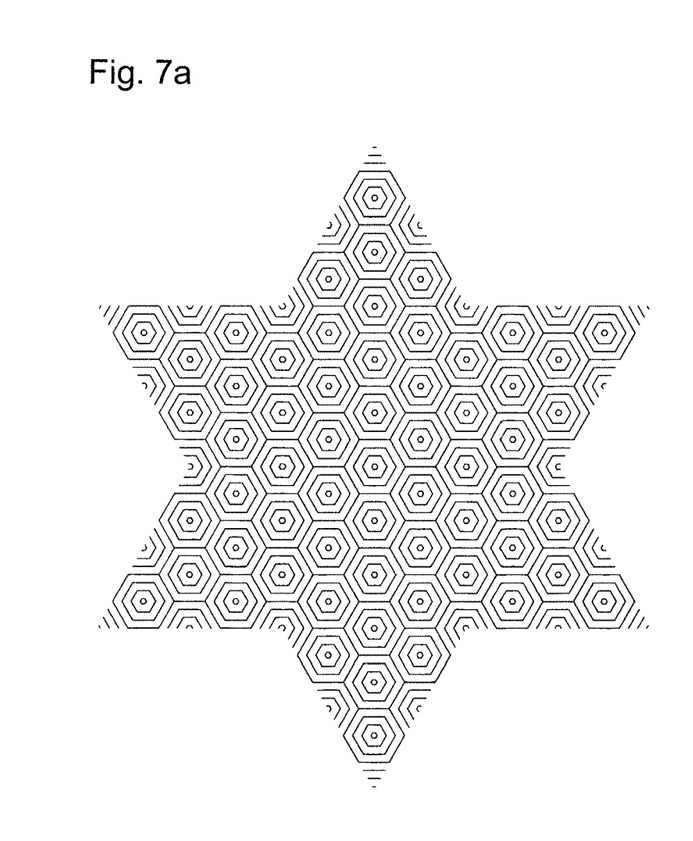
FIG. 7a is a plan view of a fourth schematically represented exemplary grid structure.
Figure 7B:
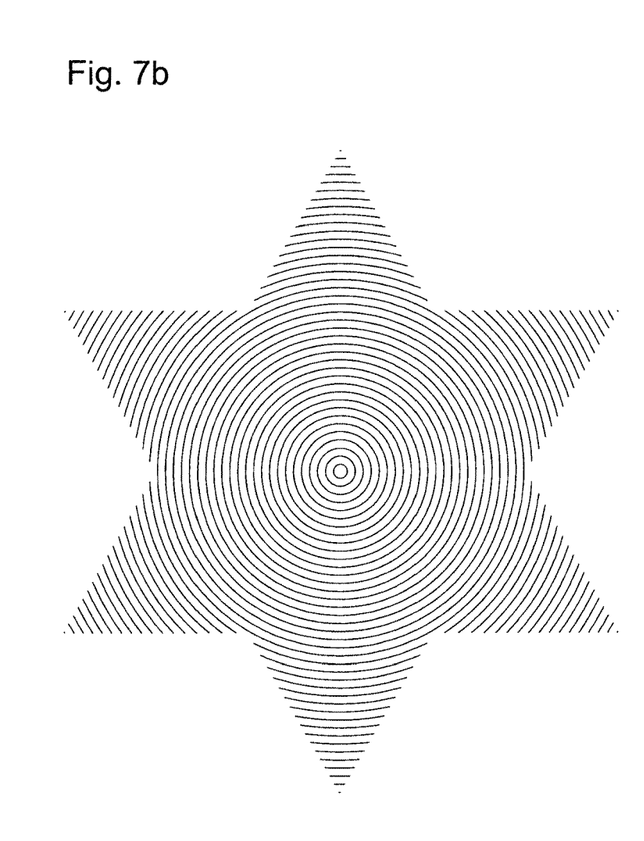
FIG. 7b is a plan view of a fifth schematically represented exemplary grid structure.

The grid structure shown in FIG. 6 consists of segments with a different grid pattern: the grid pattern in the interior of the sun consists of concentric circles, while the grid pattern of the sun's rays consists of mutually inscribed triangles, one side of the triangles being slightly curved in each case.

As has been said above, a moiré pattern can also be produced by superposition of differently formed grid structures. For example, the two grid structures illustrated in FIGS. 7a and 7b can be combined to form a moiré pattern.

Figure 8A:
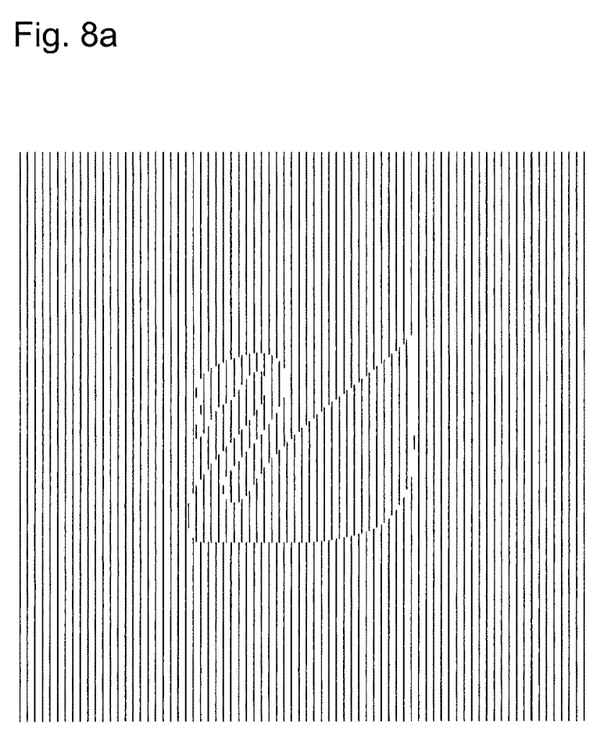
FIG. 8a is a plan view of a sixth schematically represented exemplary grid structure.
Figure 8B:
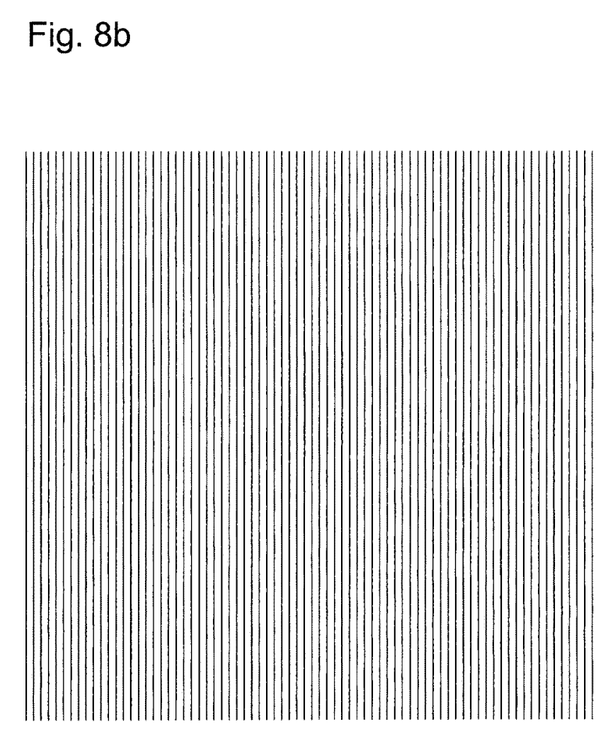
FIG. 8b is a plan view of a seventh schematically represented exemplary grid structure.
Figure 9A:
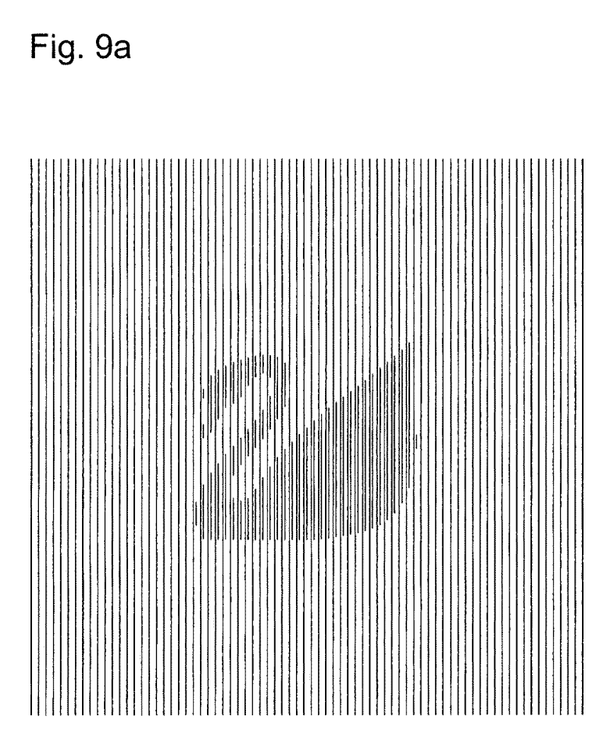
FIG. 9a is a moiré pattern that is produced by superimposing the sixth and the seventh exemplary grid structures.
Figure 9B:
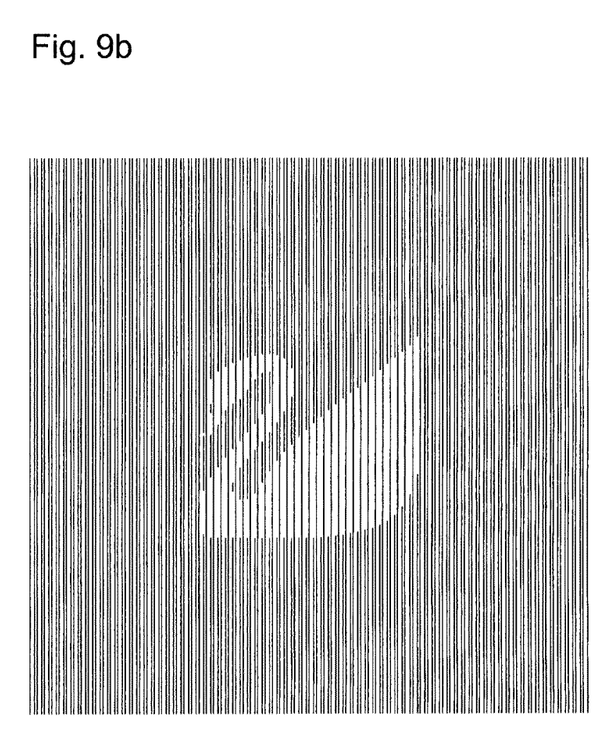
FIG. 9b is a moiré pattern that (compared to the moiré pattern illustrated in FIG. 9a) is produced by a slightly altered superimposing of the sixth and seventh exemplary grid structures.

Two further exemplary grid structures are illustrated schematically and in plan view in FIGS. 8a and 8b. The grid structure illustrated in FIG. 8a consists of two segments (namely the swan in the middle and the outer frame) with an identical, but slightly mutually displaced grid pattern. If this grid structure is now superimposed with the grid structure illustrated in FIG. 8b, then the two moiré patterns schematically illustrated in FIGS. 9a and 9b are formed as limiting cases. In the first limiting case the lines of the frame coincide with the lines of the "background grid". At the same time an impression is created that the swan has a double grid pattern (and is therefore darker). In the second limiting case the opposite is true. If the two grid structures are now visually separated from one another at least in certain regions, then under a slight change in the angle of observation and/or the angle of the incident light rays the brightness modulation alters dynamically and suddenly: the appearance of the swan "jumps" compared to the outer frame back and forth between light and dark.

The invention claimed is:

1. A laser-marked article comprising:
   a transparent or translucent region; and
   a dynamic moiré pattern in the transparent or translucent region,
   wherein the transparent or translucent region consists of a single homogenous body of a transparent or translucent brittle-hard material,
   wherein the dynamic moiré pattern is formed by superimposition of: at least one laser-engraved grid structure inside the transparent or translucent region; and
   a grid structure produced by reflection of the at least one laser-engraved grid structure at a reflecting surface of the transparent or translucent region.

2. The laser-marked article according to claim 1, wherein an outline of the at least one laser-engraved grid structure and an outline of the dynamic moiré pattern respectively form a motif.

3. The laser-marked article according to claim 1, wherein one of the at least one laser-engraved grid structure comprises at least one of:
   at least two segments having respective grid patterns that are different from one another;
   at least two segments having respective grid patterns that are identical to one another but are rotated with respect to one another; and
   at least two segments having respective grid patterns that are identical to one another but are displaced with respect to one another.

4. The laser-marked article according to claim 1, wherein the at least one laser-engraved grid structure consist of lines.

5. The laser-marked article according to claim 4, wherein the lines are arranged either equidistantly with respect to one another, or a distance between centers of two adjacent lines varies in a predetermined manner.

6. The laser-marked article according to claim 4, wherein a ratio of a gauge of a line to a distance between centers of two adjacent lines is between 1:1.5 and 1:10.

7. The laser-marked article according to claim 6, wherein the gauge of the line is less than or equal to 15 micrometers.

8. The laser-marked article according to claim 6, wherein the ratio of the gauge of the line to the distance between the centers of two adjacent lines is 1:3.5.

9. A method for producing the laser-marked article according to claim 1, comprising producing the at least one laser-engraved grid structure with aid of a pulsed laser.

10. The laser-marked article according to claim 1, wherein the dynamic moiré pattern is formed by superimposition of only one laser-engraved grid structure and a grid structure produced by reflection of the laser-engraved grid structure at a reflecting surface of the transparent or translucent region.

11. The laser-marked article according to claim 1, wherein the transparent or translucent material is glass.

12. The laser-marked article according to claim 1, wherein:
   the at least one laser-engraved grid structure is a slightly milky material changed image formed by internal laser marking sufficient to be recognizable by a human eye.

13. The laser-marked article according to claim 1, wherein:
   the at least one laser-engraved grid structure comprises dots formed by a pulsed laser.

14. The laser-marked article according to claim 1, wherein the at least one laser-engraved grid structure and the grid structure formed by reflection of the laser-engraved grid structure at a reflecting surface of the transparent or translucent region are spaced apart by a fixed distance.

15. A laser-marked article comprising:
   a transparent or translucent region;
   a coating on a surface of the transparent or translucent region; and
   a dynamic moiré pattern in the transparent or translucent region and the coating on the surface of the transparent or translucent region,
   wherein the transparent or translucent region consists of a single homogenous body of a transparent or translucent brittle-hard material,
   wherein the dynamic moiré pattern is formed by superimposition of at least two laser-engraved grid structures, at least some regions of the laser-engraved grid structures being physically separated from one another,
   wherein the physically separated at least two laser-engraved grid structures are respectively located at a given depth inside the transparent or translucent region, and inside the coating on the surface of the transparent or translucent region, and
   wherein the material of the coating is different from the material of the transparent or translucent region, and the material of the coating is chosen such that the coating can be laser-engraved at a lower intensity than the transparent or translucent region; and the laser-engraved grid structures inside the coating and inside the transparent or translucent region are identically formed and simultaneously engraved.

16. The laser-marked article according to claim 15, where the at least two laser-engraved grid structures are spaced apart by a fixed distance.

17. A method for producing the laser-marked article according to claim 15, comprising producing the at least two laser-engraved grid structures with aid of a pulsed laser, wherein the laser-engraved grid structures inside the coating and inside the transparent or translucent region are identically formed and simultaneously engraved.

* * * * *